United States Patent Office 2,838,196
Patented June 10, 1958

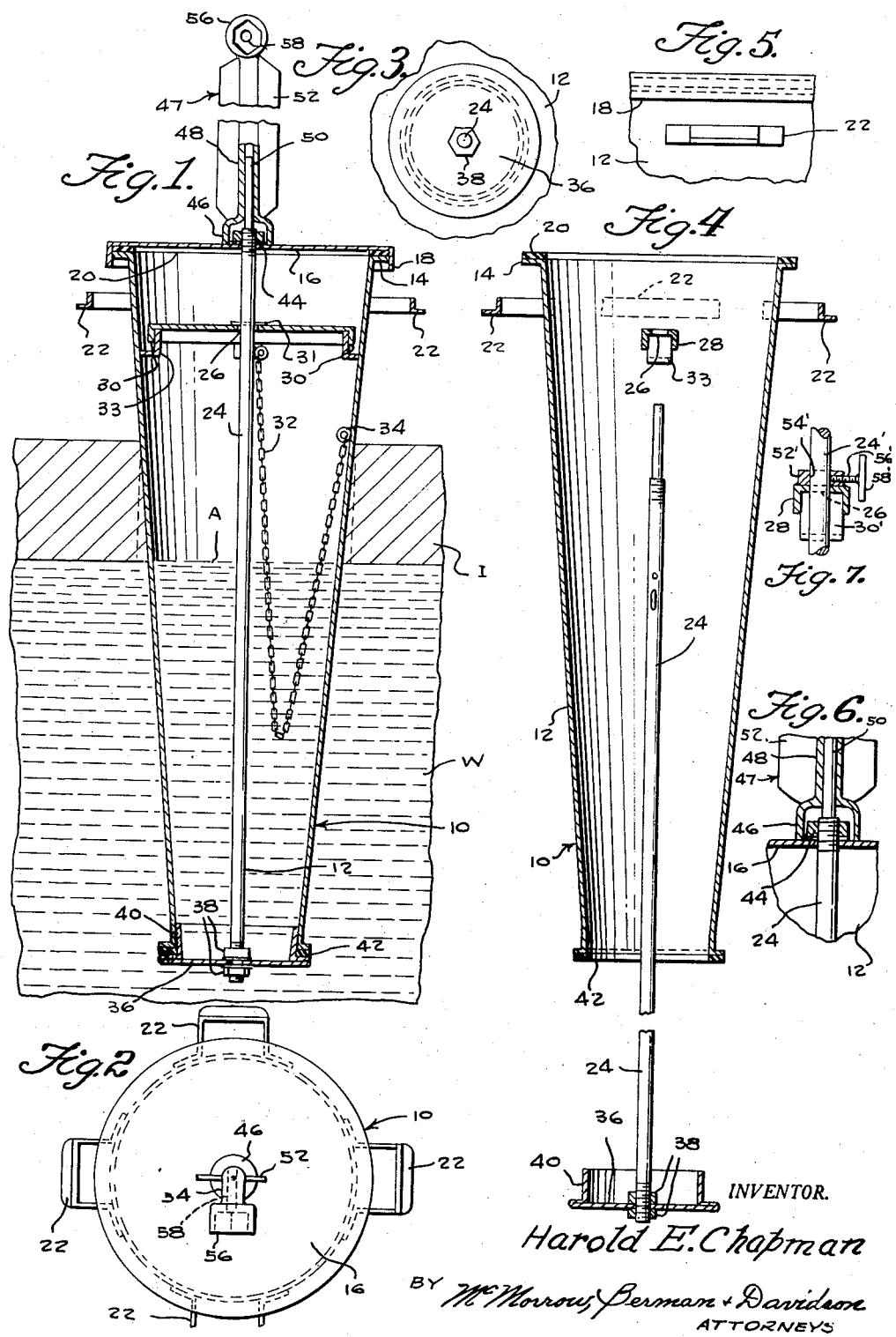

2,838,196

DEVICE TO OBTAIN ACCESS TO ICE BOUND WATER SUPPLY

Harold E. Chapman, East Corinth, Maine

Application April 20, 1956, Serial No. 579,642

5 Claims. (Cl. 220—1)

The present invention comprises a device adapted to be anchored in the ice covering a pond or other body of water, which device is adapted to provide access to water below the ice for emergency purposes, such as fire fighting.

In many sections of the country, the lakes and ponds are heavily frozen over for all or a substantial portion of the winter months. Particularly in rural sections, this poses serious problems, whenever emergency access to the water is needed. For example, when a fire occurs upon a farm, the conventional practice is to draw water from a farm pond whenever possible. It may be noted, parenthetically, that there is a pronounced trend toward the provision of ponds on individual farms, for the purpose not only of breeding fish therein for use as an additional source of food supply, but also for the purpose of providing water for fire fighting purposes.

When the ponds are heavily frozen over, access to the water for the purpose of fire fighting is seriously hindered. It becomes necessary under these circumstances to chop a hole in the ice, which of courses uses up valuable time in a situation in which every minute, and in fact every second saved is of the utmost importance.

In view of the above, the broad object of the present invention is to provide a device adapted to be anchored in the ice, which device will provide swift access to the water beneath the ice whenever emergency conditions arise. To this end, the invention, summarized briefly, is an elongated cylinder constituting a tube one end of which is disposed well below the ice, with the other end projecting above the ice, so that water can be drawn upwardly through the cylinder whenever needed. The cylinder is normally closed at its opposite ends, with the bottom end being closed by a stopper to which is connected a shaft normally held against downward axial movement within the cylinder through the provision of a cross bar and shaft retention means on the cross bar, and through the further provision of a cover for the cylinder. The construction is such as to permit the stem to be swiftly freed whenever desired, so that it can be driven downwardly to open the cylinder at its lower end, following removal of the cover and retention means. Projecting upwardly from the cover is a storm cap assembly, which ordinarily provides a marker or flag, and which protectively seals the connection between the stem and cover. The storm cap assembly is swiftly removable and includes a wrench element adapted to free a stem-engaging nut from the stem, so that the stem may be driven downwardly and the cover may be removed.

Among specific objects of the invention are the following:

To provide a device as stated which may under some circumstances be removed bodily from the ice, so that access to the water beneath the ice is had without the necessity of freeing the stem for downward axial movement;

To so form the device as to permit the stem to be swiftly disengaged for downward axial movement should the device not be removable bodily from the ice;

To so form the device as to provide a protective enclosure for the stem and other movable means, designed to prevent freezing of any component to any adjacent component that is intended to be moved relatively to the first component, when access to the water beneath the ice is desired; and To so design the device as to permit the same to be partially filled with an anti-freeze solution, which solution acts to discharge two functions, namely, a function of a balance or stabilizing means, designed to hold the device upright and keep it from rising upwardly within the ice, and second, a function of preventing water from entering the device and freezing therein.

Other objects will appear from the following description, the claims appended thereto, and from the annexed drawing, in which like reference characters designate like parts throughout the several views, and wherein:

Figure 1 is a longitudinal sectional view through a hydrant or related device formed according to the present invention, said device being shown in its closed position;

Figure 2 is a top plan view of the device;

Figure 3 is a bottom plan view in which portions have been broken away;

Figure 4 is a longitudinal sectional view through the device in a plan perpendicular to the cutting plane of Figure 1, with the device being shown in open position;

Figure 5 is a fragmentary elevational view of the upper portion of the device showing one of the handles;

Figure 6 is an enlarged, detail sectional view through the connection between the stem, cover, and storm cap assembly; and Figure 7 is a fragmentary elevational view, with portions broken away, showing alternative means for retaining the stem of the device against downward movement.

Referring to the drawings in detail, the device includes an elongated, downwardly tapering cylinder, the length and other dimensions of which may be varied as desired, according to the conditions of use expected to be encountered. For example, in sections of the country in which the ice I freezes over the water W to a great depth, the cylinder might, for example, be perhaps four feet in length. It will be understood, however, that the particular dimensions of the cylinder or of any other part are not critical, and it is not desired that the protection obtained for the invention be limited by specifying particular dimensions, except so far as is necessarily required by the scope of the appended claims:

In any event, the cylinder includes a side wall 12, tapering downwardly for a purpose to be made presently apparent. At its upper end, the side wall is integrally formed with an outwardly directed, circumferential flange 14 lying in a horizontal plane, and normally closing the upper end of the cylinder is a flat, horizontally disposed, circular cover 16 formed at its periphery with a depending circumferential flange 18 extending below the plane of flange 14 to insure, as much as possible, against rain or other moisture entering between the cover and cylinder. An annular gasket 20 of sponge rubber or the like is supported upon flange 14 and is normally held under compression between the marginal part of the cover and said flange 14.

Fixedly secured to the side wall, adjacent the upper end thereof, are U-shaped handles 22 (Figures 2 and 5), angularly spaced 90 degrees apart about the circumference of the cylinder.

Under some circumstances, the entire device can be removed bodily from the hole in which it is frozen in the ice. Under these circumstances, the handles 22 would be grasped for the purpose of exerting upward pull upon the device, and to facilitate the bodily removal of the device the outer surface of the side wall would be coated heavily with grease at the time the device is sunk in the ice.

Extending axially within the cylinder, from the upper to the lower end thereof, is a stem or rod 24, the upper end portion of said stem passing loosely an opening 26 formed in the midlength portion of a cross bar 28 of inverted U-shape in cross section. At its opposite ends, the cross bar has downwardly turned extensions 30 engaging over L-shaped brackets 33 anchored to the side wall at diametrically opposite locations thereon to support the cross bar in position extending horizontally, diametrically across the cylinder.

The stem has a small transverse opening, receiving a cotter pin 31, the ends of which are supported upon the cross bar to hold the stem normally against downwardly axial movement within the cylinder.

So that the stem will not be lost when shifted downwardly to its Figure 4 position, there is provided a chain 32 connected at one end to an eye carried by the stem just below the cross bar, and connected at its other end to an eye 34 secured to the side wall 12.

A circular stopper 36 has a smooth-walled opening receiving the lower extremity of the stem 24, and nuts 38 are threaded onto a complementarily threaded portion of the stem 24, bearing against the top and bottom faces of the stopper to fixedly connect the stopper to the stem. The stopper at its periphery has an upwardly projecting circumferential flange 40 offset inwardly from the periphery of the stopper, the flange 40 extending into the lower end portion of the tapered cylinder as shown in Figure 1. An annular gasket 42 of sponge rubber or the like is interposed between the marginal part of the stopper and the outwardly flanged lower end of the cylinder.

At its upper end, the stem 24 has a threaded portion (see Figure 6) on which is threaded a nut 44 bearing against the top surface of the cover 16. Enclosing the nut, so as to prevent the admission of moisture that might otherwise tend to freeze the nut to the stem, is a downwardly opening cap portion 46 formed as part of a storm cap assembly generally designated at 47. The cap portion 46, at its upper end, is integral with an upwardly projecting tube 48 receiving an axial extension 50 integrally formed upon stem 24 above the threaded upper end portion thereof. Extension 50 is reduced in diameter relative to the stem, and serves to support the storm cap assembly in centered position upon the cover.

Also integrally formed with the tube 48 are radial, outwardly extending blades 52, extending longitudinally of the tube 48 so as to provide a marker or flag readily seen so that the device can be swiftly found whenever its emergency use is dictated. Further, the blades provide a handle, facilitating rotation of a wrench portion including a radial extension 54 formed upon the upper end of the tube 48 (see Figure 2), said extension 54 terminating at its free end in a wrench socket 56 having a non-circular, nut-receiving recess adapted for engagement over the nut 44.

Formed in the extension 54 is an axial bore 58 opening into the socket 56. This is for the purpose of receiving the axial extension 50, when the wrench is removed by lifting the portion 46 off the nut 44 and extension 50.

In use of the device, the same is sunk in the ice as shown in Figure 1, with the lower end thereof being disposed in the water W below the ice. The stopper is tightly closed, as is the upper end of the cylinder.

Assuming that access to the water W is needed, the entire device may be lifted bodily out of the hole formed in the ice I thereby. The tapered shape of the cylinder of course aids in this respect. Further, the external surface of the cylinder may be heavily coated with grease at the time the device is embedded in the ice originally, and this further aids in freeing the device from the ice when the same is to be lifted therefrom. If the device can be lifted bodily in this manner, access to the water W is of course had through the hole formed in the ice by the cylinder.

If, however, the device is too strongly frozen in the ice, one first removes the storm cap assembly 47 and applies the wrench socket to the nut 44. A few turns of the nut causes the same to be disengaged from the threads at the upper end of the stem. This permits the nut to be lifted off, and cover 16 is removed. This provides access to the cotter pin 31, which is removed. The cross bar 28 is also lifted out of the cylinder, and the stem is now free to move axially, downwardly within the cylinder to shift the stopper away from the lower end of the cylinder, thereby to provide access to the water.

In this connection, at the time the device is originally installed in the position shown in Figure 1, it is partly filled with anti-freeze A. This prevents freezing of the stopper to the cylinder wall, and further prevents any moisture, that may enter the cylinder, from freezing. Still further, the anti-freeze provides ballast or stabilizing means for the device, that tends to hold the device upright in the ice and further prevents the device from being forced upwardly by water pressure below the same.

As seen in Figure 7, alternate means are provided for retaining the shaft of the device against downward movement. Suitably secured on the upper surface of the cross bar 28 in surrounding relationship relative to the opening 26 therethrough is a collar element 52' having a central transverse aperture portion 54' therethrough accommodating the shaft 24' therein, said shaft 24' being the same as that previously described with the exception it will not include a transverse aperture therethrough for receiving a cotter pin therein. The collar 52' incorporates a transverse threaded bore through the side wall in intersecting relationship relative to the transverse aperture 54' thereof, said internally threaded transverse bore accommodating therein a screw element 56' which has a transverse handle portion 58' secured on the end thereof, said screw element 56' being operable to clampingly engage the outer surface portion of the rod 24'. The alternative construction of Figure 7 may be utilized as a substitute for the cotter pin 31 previously described. This embodiment will not involve the necessity for overcoming the weight of the anti-freeze solution bearing on the stopper 36.

In any event, with the stem free to shift downwardly, the same can be either driven downwardly or else may be manually forced to the Figure 4 position. The chain of course prevents loss of the stem within the pond or other body of water.

A hose or similar conduit may now be extended through the cylinder, from a pump or the like, not shown, for the purpose of drawing the water through the device for use.

When the device is to be readied for its next use, it is merely necessary to pull the stem upwardly, through the cross bar, a new cotter pin being then inserted. Nut 44 is then applied, after the device has been provided with a new supply of anti-freeze solution and after cover 16 has been reapplied to the upper end of the cylinder. The storm cap assembly is now positioned upon the axial extension 50 once again, awaiting the next use of the device.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction

What is claimed is:

1. A device for obtaining access to an ice covered water supply comprising a cylinder, said cylinder being of such length as to be capable of being embedded in the ice with its upper end projecting above the ice and its lower end extending into the water below the ice; a stopper having a top surface bearing against the lower end of the cylinder to sealably close said lower end when forced upwardly thereagainst; means extending upwardly within the cylinder connected to the stopper, for shifting the stopper downwardly to open the cylinder at the lower end thereof, comprising a stem connected at one end to the stopper and extending axially of and within the cylinder to the upper end thereof; means supported by and within the cylinder normally engaging the stem against downward movement, comprising a cross bar extending diametrically within the cylinder and having a center opening, the stem being slidably engaged in said center opening and having a transverse aperture adjacent the cross bar, and a pin extending through said aperture and supported at its ends upon the cross bar, said pin being removably engaged in the aperture so as, when removed, to free the stem for downward movement; a cover having a bottom surface bearing against the upper end of the cylinder to sealably close said upper end when forced downwardly thereagainst; and a nut threaded upon the upper end of the stem and bearing against the top surface of the cover so as to draw the cover and stopper into sealing engagement with the upper and lower ends, respectively, of the cylinder, said nut being fully separable from the stem to free the cover for removal from the cylinder simultaneously with freeing the stem and stopper for gravitation from the cylinder.

2. A device for obtaining access to an ice covered water supply comprising a cylinder, said cylinder being of such length as to be capable of being embedded in the ice with its upper end projecting above the ice and its lower end extending into the water below the ice; a stopper having a top surface bearing against the lower end of the cylinder to sealably close said lower end when forced upwardly thereagainst; means extending upwardly within the cylinder connected to the stopper, for shifting the stopper downwardly to open the cylinder at the lower end thereof, comprising a stem connected at one end to the stopper and extending axially of and within the cylinder to the upper end thereof; means supported by and within the cylinder normally engaging the stem against downward movement, comprising a cross bar extending diametrically within the cylinder and having a center opening, the stem being slidably engaged in said center opening and having a transverse aperture adjacent the cross bar, and a pin extending through said aperture and supported at its ends upon the cross bar, said pin being removably engaged in the aperture so as, when removed, to free the stem for downward movement; a cover having a bottom surface bearing against the upper end of the cylinder to sealably close said upper end when forced downwardly thereagainst; and a nut threaded upon the upper end of the stem and bearing against the top surface of the cover so as to draw the cover and stopper into sealing engagement with the upper and lower ends, respectively, of the cylinder, said nut being fully separable from the stem to free the cover for removal from the cylinder simultaneously with freeing the stem and stopper for gravitation from the cylinder; and a storm cap assembly supported removably upon the cover, the stem having an axial extension and the storm cap assembly including a tube receiving said extension to hold the assembly in supported position upon the cover, said tube terminating at one end in a downwardly opening cap portion enclosing said nut, the tube at the other end thereof including a wrench socket adapted on removal of the tube from the extension, to receive the extension and engage the nut, for removing the nut from the stem.

3. A device for obtaining access to an ice covered water supply comprising a cylinder, said cylinder being of such length as to be capable of being embedded in the ice with its upper end projecting above the ice and its lower end extending into the water below the ice; a stopper having a top surface bearing against the lower end of the cylinder to sealably close said lower end when forced upwardly thereagainst; means extending upwardly within the cylinder connected to the stopper, for shifting the stopper downwardly to open the cylinder at the lower end thereof, comprising a stem connected at one end to the stopper and extending axially of and within the cylinder to the upper end thereof; means supported by and within the cylinder normally engaging the stem against downward movement, comprising a cross bar extending diametrically within the cylinder and having a center opening, the stem being slidably engaged in said center opening and having a transverse aperture adjacent the cross bar, and a pin extending through said aperture and supported at its ends upon the cross bar, said pin being removably engaged in the aperture so as, when removed, to free the stem for downward movement; a cover having a bottom surface bearing against the upper end of the cylinder to sealably close said upper end when forced downwardly thereagainst; and a nut threaded upon the upper end of the stem and bearing against the top surface of the cover so as to draw the cover and stopper into sealing engagement with the upper and lower ends, respectively, of the cylinder, said nut being fully separable from the stem to free the cover for removal from the cylinder simultaneously with freeing the stem and stopper for gravitation from the cylinder; and a storm cap assembly supported removably upon the cover, the stem having an axial extension and the storm cap assembly including a tube receiving said extension to hold the assembly in supported position upon the cover, said tube terminating at one end in a downwardly opening cap portion enclosing said nut, the tube at the other end thereof including a wrench socket adapted on removal of the tube from the extension to receive the extension and engage the nut, for removing the nut from the stem, said tube including longitudinal, radially projecting blades providing a combination marking and handle device on the storm cap assembly.

4. A device for obtaining access to an ice-bound water supply comprising a downwardly tapering hollow body formed open at its opposite ends and elongated to an extent permitting the same to be embedded in the ice with the upper end of the body projecting above the ice and the lower end thereof extending into the water below the ice; a stopper having a top surface bearing against the lower end of the body to sealably close said lower end when forced upwardly thereagainst; elongated means extending axially within the body from end to end thereof and connected at one end to said stopper; a cover having a bottom surface bearing against the upper end of the body to sealably close said upper end when forced downwardly thereagainst, said cover having an opening and said means extending through the opening of the cover to project above the cover; a cross bar detachably mounted in said body and spaced below said cover, said elongated means extending slidably through said cross bar and including an abutment element engageable on said cross bar to at times support said elongated means axially in the body; and a retaining element mounted upon the upwardly projecting end of said elongated means for adjustment longitudinally of said means into engagement with the top surface of the cover, whereby to draw the cover and stopper in opposite directions axially of the body into sealing engagement with the upper and lower ends, respectively, of the body, responsive to adjustment of said element longitudinally of said means in the direction of the cover.

5. A device for obtaining access to an ice-bound water supply comprising a downwardly tapering hollow body formed open at opposite ends thereof, said body being of a length such as to be capable of being embedded in the ice with the upper end projecting above the ice and the lower end extending into the water below the ice; a stopper having a top surface bearing against the lower end of the body to sealably close said lower end when forced upwardly thereagainst; a cover having a bottom surface bearing against the upper end of the body to sealably close said upper end when forced downwardly thereagainst; a stem extending axially within the body and connected at one end to the stopper, the cover having a center opening and the other end of the stem being threaded and extending through the center opening above the cover; a cross bar detachably mounted in said body and spaced below said cover, said stem extending slidably through said cross bar and being provided with an abutment element detachably secured thereto and engageable on said cross bar to at times to support said stem axially in the body; and a nut threaded upon said other end of the stem and bearing against the top surface of the cover so as to draw the cover and stopper axially of the body into sealing engagement with the upper and lower ends, respectively, of the body responsive to threading of the nut along the stem toward the cover, said nut being fully separable from the stem when threaded in an opposite direction to free the cover for removal from the body and stem, said abutment element being detachable from the stem to free the stem and stopper for gravitation from the cylinder.

References Cited in the file of this patent

UNITED STATES PATENTS

| | | |
|---|---|---|
| 946,329 | Brown | Jan. 11, 1910 |
| 986,467 | Killion | Mar. 14, 1911 |
| 1,206,613 | Teeling | Nov. 28, 1916 |
| 2,033,880 | Coles et al. | Mar. 10, 1936 |
| 2,161,060 | Kelsey | June 6, 1939 |
| 2,258,285 | Fish | Oct. 7, 1941 |
| 2,515,770 | Gronberg | July 18, 1950 |

FOREIGN PATENTS

| | | |
|---|---|---|
| 323,569 | Germany | Aug. 2, 1920 |